(12) United States Patent
Weberruss et al.

(10) Patent No.: US 6,505,542 B2
(45) Date of Patent: Jan. 14, 2003

(54) PISTON ROD-LESS LINEAR DRIVE AND A HOUSING THEREFOR

(75) Inventors: Rolf Weberruss, Kernen (DE); Eric Angué, Stuttgart (DE); Thomas Wagner, Remseck (DE)

(73) Assignee: Festo AG & Co., Esslingen (DE)

( * ) Notice: Subject to any disclaimer, the term of this patent is extended or adjusted under 35 U.S.C. 154(b) by 0 days.

(21) Appl. No.: 09/932,478

(22) Filed: Aug. 17, 2001

(65) Prior Publication Data
US 2002/0023534 A1 Feb. 28, 2002

(30) Foreign Application Priority Data
Aug. 23, 2000 (EP) .............................. 00118061

(51) Int. Cl.$^7$ .............................................. F01B 29/00
(52) U.S. Cl. .......................................................... 92/88
(58) Field of Search ................................. 92/88, 165 R; 244/63

(56) References Cited

U.S. PATENT DOCUMENTS 5,311,810 A * 5/1994 Takada et al. ................. 92/88

FOREIGN PATENT DOCUMENTS

| DE | 942 179 C | 4/1956 |
| EP | 0 612 377 B1 | 8/1994 |
| GB | 470088 | 8/1937 |
| WO | WO 98/46889 | 10/1998 |

OTHER PUBLICATIONS

Author: Eberhard Reinke; Title: "Kolbenstangenlose Pneumatikantriebe mit Profil"; Olhydraulik und Pneumatik 37(5):466–467; Date of Publication: May, 1993; Place of Publication: Mainz, Germany.

* cited by examiner

Primary Examiner—Edward K. Look
Assistant Examiner—Thomas E. Lazo
(74) Attorney, Agent, or Firm—Hoffmann & Baron, LLP

(57) ABSTRACT

A piston rod-less linear drive whose housing is provided with a linear guide on which a guide slide runs. The guide slide is drivingly connected by way of a dog with a drive part within the housing. The dog extends through a longitudinal slot in the housing, such slot being so arranged that its plane extends obliquely in relation to a guide plane, which is defined by the longitudinal direction and the transverse direction of the linear guide. Furthermore, a housing is proposed which is particularly suitable for the linear drive.

17 Claims, 2 Drawing Sheets

PISTON ROD-LESS LINEAR DRIVE AND A HOUSING THEREFOR

The invention relates to a piston rod-less linear drive comprising an elongated housing having a receiving space for a drive part adapted to perform an axial movement, said drive part being kinematically coupled by way of dog extending through a longitudinal slot in the housing with a guide slide, said guide slide being movingly guided on a linear guide externally on the housing in the longitudinal direction thereof, said linear guide possessing two guide sections directed in a transverse direction laterally toward opposite longitudinal sides.

Furthermore the invention relates to the housing of a linear drive, which is more especially of the type initially mentioned, comprising a receiving space, extending in the longitudinal direction, for an axially movable drive part, and moreover a longitudinal slot rendering possible the extension therethrough of a dog kinematically coupled with the drive part, the envelope curve of the cross sectional shape of the housing being delimited at least in the longitudinal portion, which contains the longitudinal slot, of the housing, by four delimiting lines at least substantially forming a rectangle.

Such a piston rod-less linear drive with a correspondingly designed housing is disclosed in the European patent publication 0 612 377 B1. This known linear drive has housing with a rectangular outline in cross section with a receiving space containing a piston-like drive part, a radially extending through slot being provided at one point in the housing wall, such slot opening internally into the receiving space and externally into a section of the outer face of the housing.

On an adjoining external face section, running perpendicular to this, of the housing a linear guide is provided constituted by a guide rail, on which there linearly runs a guide slide, such guide slide being connected with the dog in a driving manner. The linear movement of the drive part results in a ganged, guided linear movement of the guide slide, such slide being provided on a support face with attachment means for the attachment of a load to be moved.

The known linear drive is admittedly characterized by an extremely high quality of the longitudinal guide function. Furthermore it possesses relatively compact dimensions. However extensive parts of the outer face of the housing are occupied by the linear guide and by the force coupling means present between the drive part and the guide slide so that in effect only two outer side sections of the housing of the linear drive are available for attachment or fastening purposes.

Accordingly it is one object of the present invention to provide a piston rod-less linear drive and a housing more particularly suitable therefor, in the case of which despite the compact dimensions extensive areas of the outer side of the housing may still be kept accessible.

In order to achieve these and/or other objects appearing from the present specification, claims and drawings, the invention provides a piston rod-less linear drive of the type initially mentioned in which the longitudinal slot is so arranged that its plane extends obliquely in relation to the guide plane, defined by the transverse direction and the longitudinal direction, of the linear guide, the outer of such slot opening facing the guide plane.

In connection with a housing of the type initially mentioned the object of the invention is attained even because the plane of the longitudinal slot, as viewed in the cross section of the housing, extends in such an oblique fashion that it intersects the envelope curve at an angle departing from 90 degrees.

Whereas in the case of a structural design in accordance with the said European patent publication 0 612 377 B1 the plane of the longitudinal slot extends in parallelism to the guide plane defined by the linear guide, something which means that a large area of the outer periphery of the housing is occupied, the oblique arrangement of the longitudinal slot results in there being a close association between the dog and the linear guide without this resulting in disadvantages as regards the quality of the guiding action, there furthermore being an availability of large areas of the housing's periphery for or other fastening purposes. In this respect it is possible to arrange the linear guide and the longitudinal slot very close together.

Irrespectively of any possibly present linear guide in the case of a housing, which is normally shaped with a rectangular outline, the plane of the slot may be so aligned that it extends neither in parallelism nor at a right angle to the envelope line of the cross sectional outline of the housing and owing to such oblique arrangement there will be a favorable placement of the outer opening of the longitudinal slot, which keeps the major part of the rectangular outline of the housing available for any desired purposes.

Further advantageous developments of the invention are defined in the dependent claims.

It is convenient for the longitudinal slot to be so arranged that the plane thereof makes an acute angle with the guide plane defined by the linear guide.

In the case of a particularly compact design there is an at least partial overlap of the linear guide with the receiving space in the transverse direction of the guide plane. The dog may in this case run past the linear guide obliquely.

In the case of a further advantageous design the outline of the housing of the linear drive is characterized by an outer face, which possesses four outer face sections opposite to one another in pairs, of which one section has the linear guide and of which other sections are designed to serve as fastening or mounting faces.

The fastening faces may possess fastening means able to be relied upon for the attachment of the housing or for the attachment of additional part on the housing. In this case the longitudinal slot is preferably so shaped that it either directly opens in the outer face section of the housing having the linear guide or opens in a transitional zone between this above mentioned outer face section and one of the two fastening or attachment faces adjoining such section of the outer face section.

In the case of a housing possessing a rectangular outline it is possible for the dog to run within the envelope curve of the cross sectional outline toward the outer face section, having the linear guide, of the housing so that there are no projecting components.

The linear guide is preferably connected along its entire length directly with the housing of the linear drive, it more particularly being designed in the form of a guide rail, which is preferably secured to the housing without the use of screws. Attachment may be by means of swaging rolling operation or preferably by an integral design of the guide rail, and the housing, for example by extrusion.

The linear drive may be designed as an electrically operated unit and for instance possess a lead screw drive which is able to move a lead screw nut serving as the drive part. It is more particularly advantageous however for the design to be such that the drive part is in the form of a piston and for the actuating force to be provided by the action of a fluid. In such a case a sealing means is provided for the longitudinal slot to prevent uncontrolled loss of fluid.

Further advantageous developments and convenient forms of the invention will be understood from the following detailed descriptive disclosure of one embodiment thereof in conjunction with the accompanying drawings.

Figure 1:
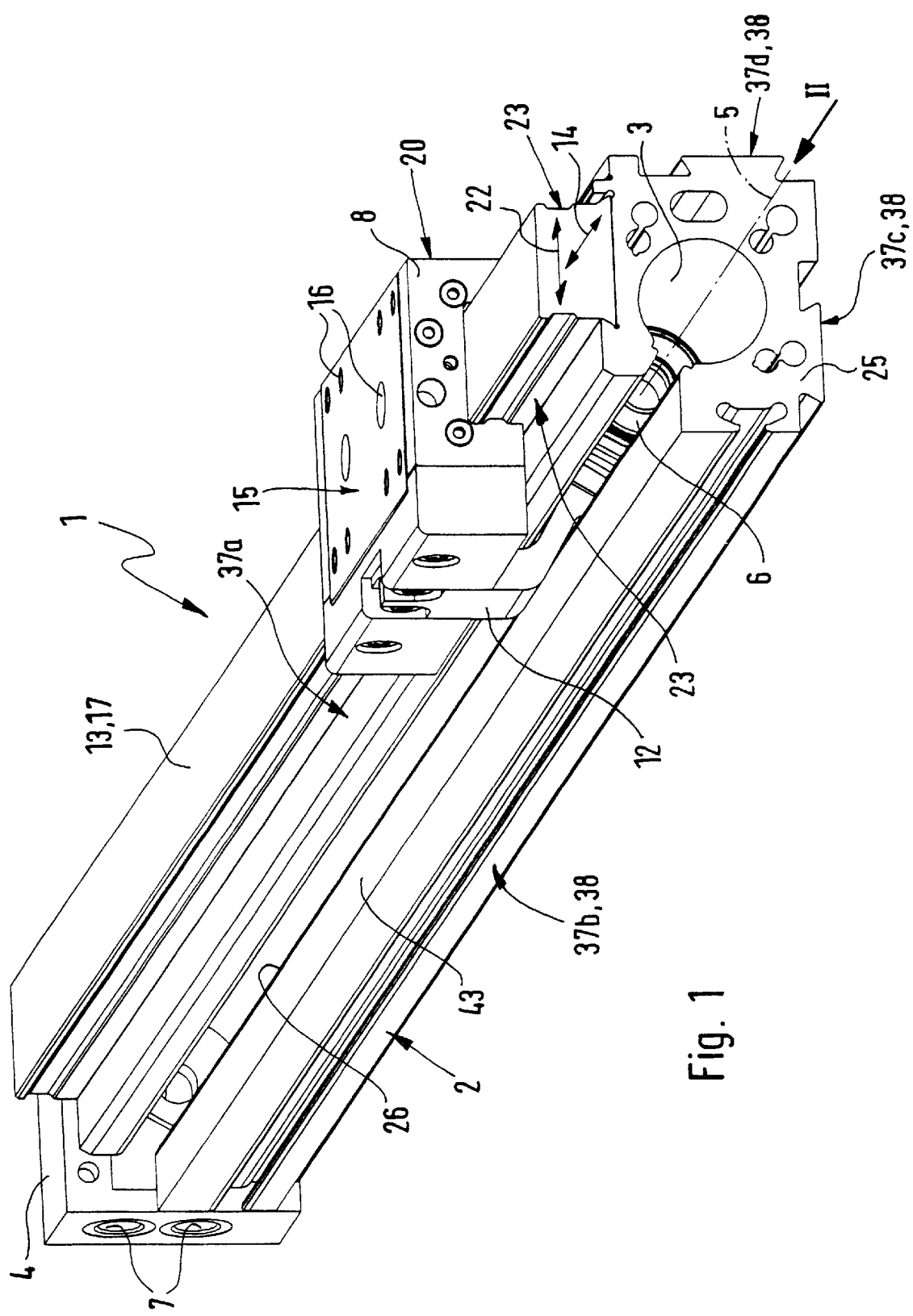
FIG. 1 shows a first design of the linear drive in accordance with the invention, which possesses a housing in accordance with the invention, a conventionally present terminating cover and a sealing means for the longitudinal slot being omitted in the drawing in order to make it more straightforward.

The piston rod-less linear drive 1 illustrated in the drawing is operated by fluid power and more particularly pneumatically. It possesses an elongated housing 2, which is tubular in design and in the interior delimits a preferably cylindrically shaped receiving space 3, which at the end is sealed off by a terminating cover 4 mounted on the housing 2. FIG. 1 shows the housing 2 in a condition, in the case of which the front terminating cover is removed so that the preferred circular outline of the receiving space 3 can be seen.

In the interior of the receiving space 3 a piston drive part 6 is located which is able to be driven in the direction of the longitudinal axis 5 of the housing and divides the receiving space into two axially sequential working chambers in a fluid-tight fashion.

By way of connection openings 7, which in the working embodiment are jointly provided in the rear terminating cover 4, it is possible for the supply and removal of pressure medium to take place into and out of the working spaces. The housing 2 may for this purpose have internal fluid ducts. By controlled fluid actuation it is thus possible for the drive part 6 to be caused to perform a drive movement in the same direction as the longitudinal axis 5 of the housing.

The drive movement of the drive part 6 may be transmitted to a guide slide 8 outside the housing 5, such slide 8 being kinematically coupled by means of a dog 12 with the drive part 6 for axial motion. The drive part 6 is omitted from FIG. 2.

The guide slide 8 is mounted for motion in the longitudinal direction of the housing on a linear guide 13 provided externally on the housing 2. The longitudinal direction 14, indicated by the double arrow, of the linear guide 13 extends in parallelism to the longitudinal axis 5 of the housing.

Figure 2:
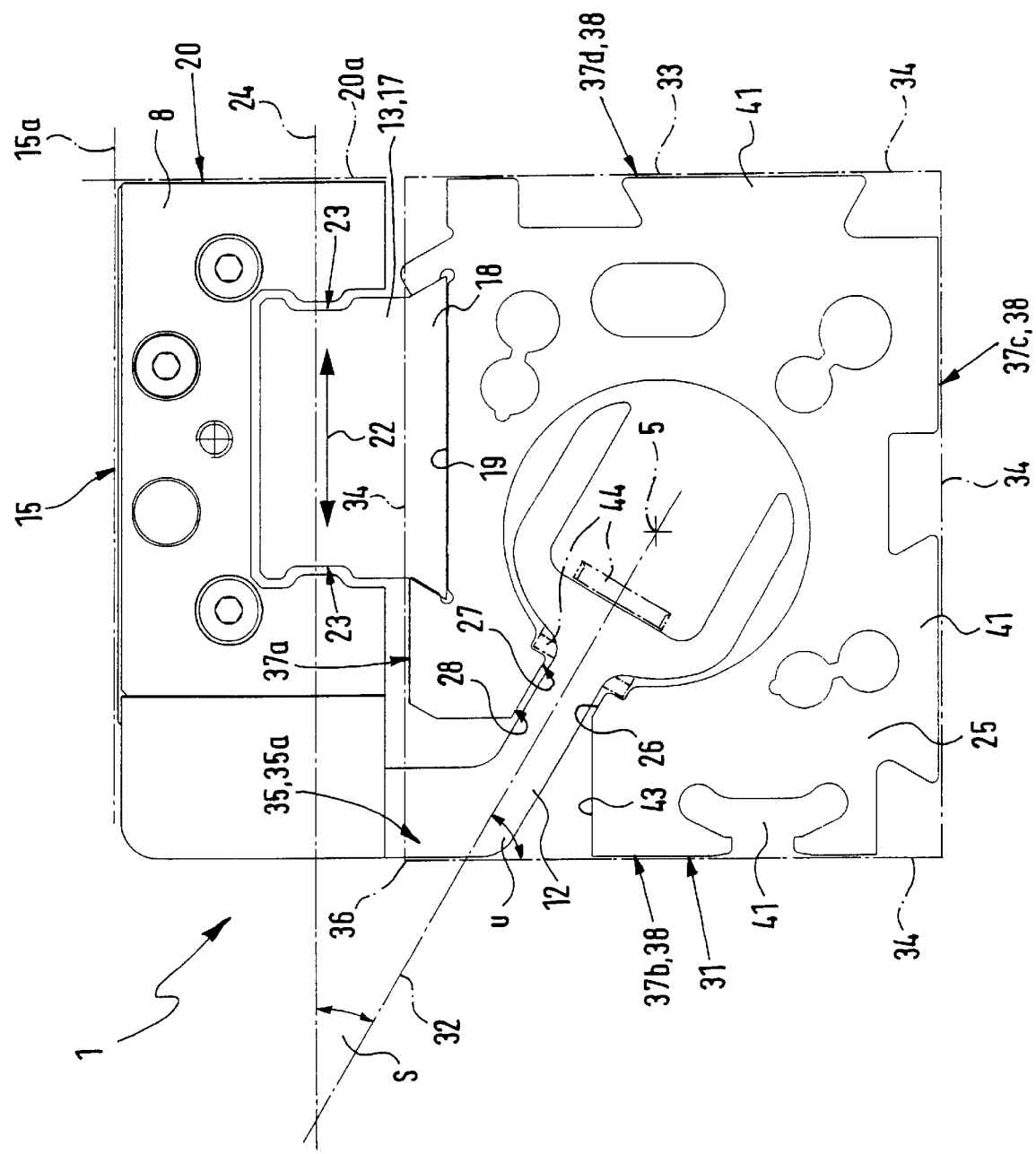
FIG. 2 shows an end-on view of the linear drive of FIG. 1 looking as indicated by the arrow II.

FIGS. 1 and 2 show the linear drive 1 so arranged that the linear guide 13 is on top. The guide slide 8, which preferably straddles the linear guide 13, is provided with a support or running face 15 on the top side, facing away from the longitudinal guide 13, fastening means 16 being provided on such support face 15 in order to be able to attach a load to the support face 15, which load is to the moved or transported.

The linear guide 13 is connected with the housing 2 along its full length. Preferably, it is constituted by a guide rail 17, which is more particularly attached on the outer face of the housing 2 without using screws. By way of example only the working embodiment includes a screwless attachment produced by swaging rolling, the guide rail having a foot portion 18 thereof seated in a groove 19 in the housing for its entire length, one flank being swaged by a rolling operation in order to fixedly hold the foot section portion 18.

In the case of an alternative design, not illustrated, the guide rail 17 is in the form of an integral component of the housing 2 so that together with the same it may be produced by extruding in a highly rational manner.

The linear guide 13 possesses two guide sections 23 facing sideways in a transverse direction 22 as indicated by a double arrow, toward opposite longitudinal sides of the housing 2, such guide sections preferably being constituted by guide paths and extending along the full length of the linear guide 13. The guide slide 8 bears directly or indirectly on same, such indirect engagement being ensured for example by the intermediate placement of a rolling or sliding member, not illustrated. This will mean that the guide slide 8 is supported in the transverse direction 22 in relation to the linear guide 13, the guide sections 23 also being able to take up forces, which act owing to a load secured to the support face 15, at a right angle to the transverse direction 22 on the linear guide.

Owing to the cooperation between the guide slide 8 and the linear guide 13 it is possible to ensure that reaction forces other than those acting in the longitudinal direction 14 and due to a load to be moved, do not act on the drive part 6 but are rather exclusively taken up by the linear guide 13 or, respectively, the housing 2 bearing it.

All in all it is possible to state that the linear motion performed by the guide slide 8 during operation of the linear drive 1 takes place in a guide plane 24, which is defined by the longitudinal direction 14 and the transverse direction 22, at a right angle thereto, of the linear guide 13. The plane 15a of the extent of the above mentioned support or bearing face 15 extends preferably in parallelism to the guide plane 24. The dog 12 may be designed with a narrow shape like a finger and extend through a longitudinal slot 26 provided at one point on the periphery of the receiving space 3 in the housing wall 25. The length of the longitudinal slot 26 will be equal to the length of the housing 2. The longitudinal slot 26 opens at an inner opening 27 into the receiving space 3 and at an opposite outer opening 28 at the longitudinal outer face 31 of the housing 2. The slot plane defined by the longitudinal direction and the depth direction of the longitudinal slot 26 is indicated in FIG. 2 in chained lines at 32.

As will be furthermore readily seen from FIG. 2 the plane 32 of the slot extends obliquely in relation to the guide plane as defined by the linear guide 13 and more especially makes an acute angle "s" with this side, which faces the linear guide 13. In this case the outer slot opening 28 faces the guide plane 24. It is also possible to state that the longitudinal slot 26 extends from the receiving space 3 to the side of the linear guide 13. Owing to such measure there is more particularly an excellent availability of the outer face 31 of the housing 2 for various uses, for example for attachment purposes.

This advantage is made particularly clear by the selected preferred geometry of the housing 2 adopted in the working example and which may be termed a housing with a rectangular cross sectional outline or shape, because an envelope curve 33 laid around the cross sectional outline will have a rectangular form. It is made up of four straight delimiting lines 34, which constitute the four sides of a rectangle.

At least in the length section containing the longitudinal slot 26 the housing 2 possesses the above mentioned configuration. In the working embodiment illustrated this will apply for the entire length of the housing, because the longitudinal slot 26 is axially continuous.

Within the rectangular cross section defined by the envelope curve the longitudinal slot 26 is so obliquely set that its plane 32 intersects the envelope curve 33 at an angle "u" departing from 90 degrees.

The particular advantage of the oblique alignment of the longitudinal slot 26 will become clear from FIG. 2. Accordingly there is for example the possibility of so selecting the oblique inclination of the plane 32 of the slot that it intersects the envelope curve 33 in a corner portion 35 by either exactly intersecting the apex 36 or extending past the apex 36 at a small distance from same. Then only this corner portion 35 will be occupied by the longitudinal slot 26, whereas the remaining major part of the rectangular outline will remain available for other measures useful for application of the linear drive 1.

This does not necessarily have to be used for the installation of a linear guide on the housing 2, but nevertheless such a use offers itself. Then there would be the possibility appearing from the drawing of making available, in addition to the first outer face section 37*a* (which has a linear guide 13) in all, three further outer face sections 37*b*, 37*c* and 37*d* associated with the other delimiting lines 34, which sections 37*b*, 37*c* and 37*d* could for instance be designed in the form of fastening faces 38. In the case of a housing 2 with a rectangular outline there would be accordingly would be in all three rectangle sides available for attachment purposes, only that attachment face 38 being slightly narrow, which is at the corner portion 35, this feature however hardly impairing utility. As compared with conventional linear drives, in the case of which only two attachment faces are available on the housing, the specific design of the invention as regards the longitudinal slot provides decidedly more possibilities of attachment.

The attachment or mounting faces 38 are in the working embodiment provided with attachment means 41 in the form of for example, projections or groove-like recesses, which means 41 may be employed for fastening the housing 2 to a supporting structure of any desired type or for the arrangement thereon of additional components, as for instance sensors or valves.

In addition to the support face 15 at least one further support face 20 can be provided, whose plane 20*a* of extent is at a right angle to the guide plane 24 and which is furnished with attachment means, not illustrated, which also serve for securing loads to be moved. It is preferred for the further support face 20 to be located on the longitudinal side, opposite to the point of engagement of the dog 12, of the guide slide 8. It will be clear that when appropriate only one of the two support faces 15 and 20 will be present, which furthermore may be termed attachment or fastening faces.

Owing to the specific geometry of the longitudinal slot it is possible on the one hand to design a linear guide 13 which in the transverse direction 22 is relatively broad and is hence capable of bearing a relatively heavy load on the other hand to have compact dimensions in the transverse direction 22.

In this connection the linear guide 13 is preferably so placed that it overlaps the receiving space 3 in the transverse direction 22 of the guide plane 24 a bit. From the point of view of the support face 15 accordingly a part of the width of the receiving space 3 is covered over by the linear guide 13. Nevertheless there will be no danger of collision between the linear guide 13 and the dog 22, because the latter runs obliquely past the linear guide 16 on its way from the receiving space 3 to the guide slide 15.

The position of the opening of the longitudinal slot 26 at the outer face 31 of the housing 2 will depend on the angle "s" of inclination between the plane 32 of the slot and the guide plane 24. In the working embodiment illustrated the outer slot opening 28 is generally at the transitional zone 35*a* between the outer face section 37*a* having the linear guide 13, and the further outer face section 37*b* adjoining same. If an arrangement were to be adopted, in the case which the slot plane 32 containing the housing's longitudinal axis 5, were at a steeper angle, that is to say in terms of the arrangement of FIG. 2, closer to the linear guide 13, it would be readily possible to provide an arrangement, in which the slot plane 32 would extend through the same section 37*a* of the outer face, which also has the linear guide 13 (not illustrated).

It is convenient to so select the oblique setting of the longitudinal slot 26 that the outer slot opening 28 assumes a position as illustrated in the transitional zone 35*a* or, respectively, in one of the corner portions 35 of the envelope curve 33, as is the case in the working example. Accordingly it is then possible not only to make the attachment face 37*a* and 38 adjoining the one side of the corner portion 35 relatively wide, but furthermore it is possible for the first section 37*a* of the outer face to have a relatively large overall width, which may be employed for the accommodation of a broad linear guide 13. In order nevertheless to prevent the housing 2 being exceeded in its extent by the dog 12 or by the guide slide 8 in the transverse direction 22, the configuration of the dog 12 will preferably be so selected to be so angled or curved that even within the envelope curve 33 it extends to the outer face section 37*a* of the housing 2 having the linear guide 13. This means that the dog 12 will engage the longitudinal face, facing the corner portion 35, of the guide slide 8, the entire movable arrangement—as considered in plan view of the support face 15—remaining within the outline of the associated section 37*a* of the outer face.

A particularly compact arrangement of the coupling portion between the dog 12 and the guide slide 8 is one in which in the transitional zone 35*a* between the outer face section 37*a*, which has the linear guide 13, and the further outer face section 37*b* at the outer slot opening 28, adjoining it a recess 43 is provided extending along the length of the housing 2, within which recess the angled length section of the dog 12 is located.

It remains to be noted that a seal means 44, which is only indicated in chained lines in FIG. 2 is provided for the longitudinal slot 26 more especially in the case of a fluid power linear drive 1, such seal more particularly including a flexible sealing tape, which coming from the receiving space 3 can make contact with the housing sections delimiting the longitudinal slot to seal off the inner slot opening 27. The sealing action takes place axially on either side of the drive part in the form of a piston, the sealing tape being moved clear of the longitudinal slot wall at the dog 12 in the pressureless portion of the drive part 6 in order to permit the extension of the dog 12 through the slot.

What is claimed is:

1. A piston rod-less linear drive comprising an elongated housing having a receiving space for a drive part adapted to perform an axial movement, said drive part being kinematically coupled by way of dog extending through a longitudinal slot in the housing with a guide slide, said guide slide being movingly guided on a linear guide externally on the housing in the longitudinal direction thereof, said linear guide possessing two guide sections directed in a transverse direction laterally toward opposite longitudinal sides, wherein the longitudinal slot is so arranged that its plane extends obliquely in relation to the plane, defined by the transverse direction and the longitudinal direction, of the linear guide, the outer opening of the slot facing the guide plane.

2. The linear drive as set forth in claim 1, wherein the plane of the slot makes an acute angle with the guide plane.

3. The linear drive as set forth in claim 1, wherein the linear guide and the receiving space obliquely overlap at least somewhat in the transverse direction of the guide plane, the dog extending obliquely somewhat past the linear guide in the direction toward the guide slide.

4. The linear drive as set forth in claim 1, comprising an outer face delimiting the outline of the housing having four outer face sections opposite to each other in pairs, of which one is provided with a linear guide, whereas the others are designed in the form of attachment faces, the longitudinal slot opening at the outside on the outer face section having the linear guide or at a transition zone between same and one of the adjoining attachment faces.

5. The linear drive as set forth in claim 4, wherein the envelope curve of the cross section outline of the housing is formed at least in the length section of the housing having the longitudinal slot by four delimiting lines at least substantially describing a rectangle, of which respectively one is associated with the outer face sections.

6. The linear drive as set forth in claim 5, wherein within the envelope curve the dog extends to the outer face section, having the linear guide, of the housing.

7. The linear drive as set forth in claim 1, wherein the longitudinal slot on the outside opens at an transitional zone between an outer face section having the linear guide and a further rectangularly adjoining outer face section, a recess preferably extending in the transitional zone in the longitudinal direction of the housings, in which recess the dog is angled toward the outer face section having the linear guide.

8. The linear drive as set forth in claim 1, wherein the linear guide is constituted by a guide rail.

9. The linear drive as set forth in claim 8, wherein the guide rail is secured to the housing without screw means, as for example by swaging rolling or design as an integral housing component.

10. The linear drive as set forth in claim 1, wherein the guide slide straddles the linear guide on the face thereof facing away from the housing.

11. The linear drive as set forth in claim 1, having a design operated by fluid power, wherein the drive part is a fluid power operated piston and a sealing means is provided for the longitudinal slot.

12. The linear drive as set forth in claim 1, wherein the guide plane extends in parallelism or at a right angle to the plane of extent of a support face of the guide slide serving for the attachment of a load to be moved.

13. The linear drive as set forth in claim 1, wherein the plane of the slot extends through the outer face section also having the linear guide.

14. The linear drive as set forth in claim 1, wherein the plane of the slot extends through the outer face of the housing in the transitional zone between the outer face section having the linear guide and a further outer face section adjoining same at a right angle.

15. A linear drive housing, comprising a receiving space, extending in the longitudinal direction, for an axially movable drive part, and moreover a longitudinal slot rendering possible the extension therethrough of a dog kinematically coupled with the drive part, the envelope curve of the cross sectional shape of the housing being delimited at least in the longitudinal portion, which contains the longitudinal slot, of the housing, by four delimiting lines at least substantially forming a rectangle, wherein the plane of the longitudinal slot is, as considered in a cross section of the housing, at such an oblique angle that it intersects the envelope curve at an angle departing from 90 degrees.

16. The linear drive housing as set forth in claim 15, wherein the slot plane intersects the envelope curve in a corner portion, preferably at a small distance from the associated apex.

17. The linear drive housing as set forth in claim 15, wherein the housing has a recess longitudinally extending in one of the corners portions of the envelope curve and the longitudinal slot opens toward said recess.

* * * * *

UNITED STATES PATENT AND TRADEMARK OFFICE
CERTIFICATE OF CORRECTION

PATENT NO. : 6,505,542 B2  Page 1 of 1
DATED : January 14, 2003
INVENTOR(S) : Rolf Weberruss et al.

It is certified that error appears in the above-identified patent and that said Letters Patent is hereby corrected as shown below:

Column 6,
Line 55, now reads "the plane" should read -- a guide plane --.
Line 62, now reads "obliquely overlap" should read -- overlap --

Column 7,
Line 5, now reads "same" should read -- the outer face section having the linear guide --
Lines 7-8, now reads "the envelope" should read -- an envelope --
Line 17, now reads "an transitional" should read -- a transitional --
Lines 26-27, now reads "as for example by" should read -- by one of --

Column 8,
Line 10, now reads "the transitional zone" should read -- a transitional zone --
Line 12, now reads "same" should read -- the outer face section having the linear guide --
Line 17, now reads "the envelope" should read -- an envelope --

Signed and Sealed this

Twenty-sixth Day of August, 2003

JAMES E. ROGAN
*Director of the United States Patent and Trademark Office*